(No Model.)

W. C. FORTNEY.
BICYCLE.

No. 548,187.

Patented Oct. 22, 1895.

WITNESSES:
Petter Carlsen
C. C. Carlsen

INVENTOR:
William C. Fortney
BY his ATTORNEY:
A. M. Carlsen

UNITED STATES PATENT OFFICE.

WILLIAM C. FORTNEY, OF FORT NIOBRARA, NEBRASKA, ASSIGNOR OF ONE-HALF TO EDWARD C. FRITZ, OF SAME PLACE.

BICYCLE.

SPECIFICATION forming part of Letters Patent No. 548,187, dated October 22, 1895.

Application filed December 26, 1894. Serial No. 533,034. (No model.)

*To all whom it may concern:*

Be it known that I, WILLIAM C. FORTNEY, a citizen of the United States, residing at Fort Niobrara, in the county of Cherry and State of Nebraska, have invented certain new and useful Improvements in Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bicycles.

The combined objects of my invention are to provide a bicycle adapted to be easily and conveniently ridden and steered by two persons, whether ladies or gentlemen, and in which the speed of the carrier-wheels relatively to the pedals may readily be changed while riding, so as to enable thereby the rider or riders to convert the speed into extra force in going uphill and to convert force into extra speed in going downhill or on level ground. These and other objects I attain by the novel construction and arrangement of parts illustrated in the accompanying drawings, in which—

Figure 1:
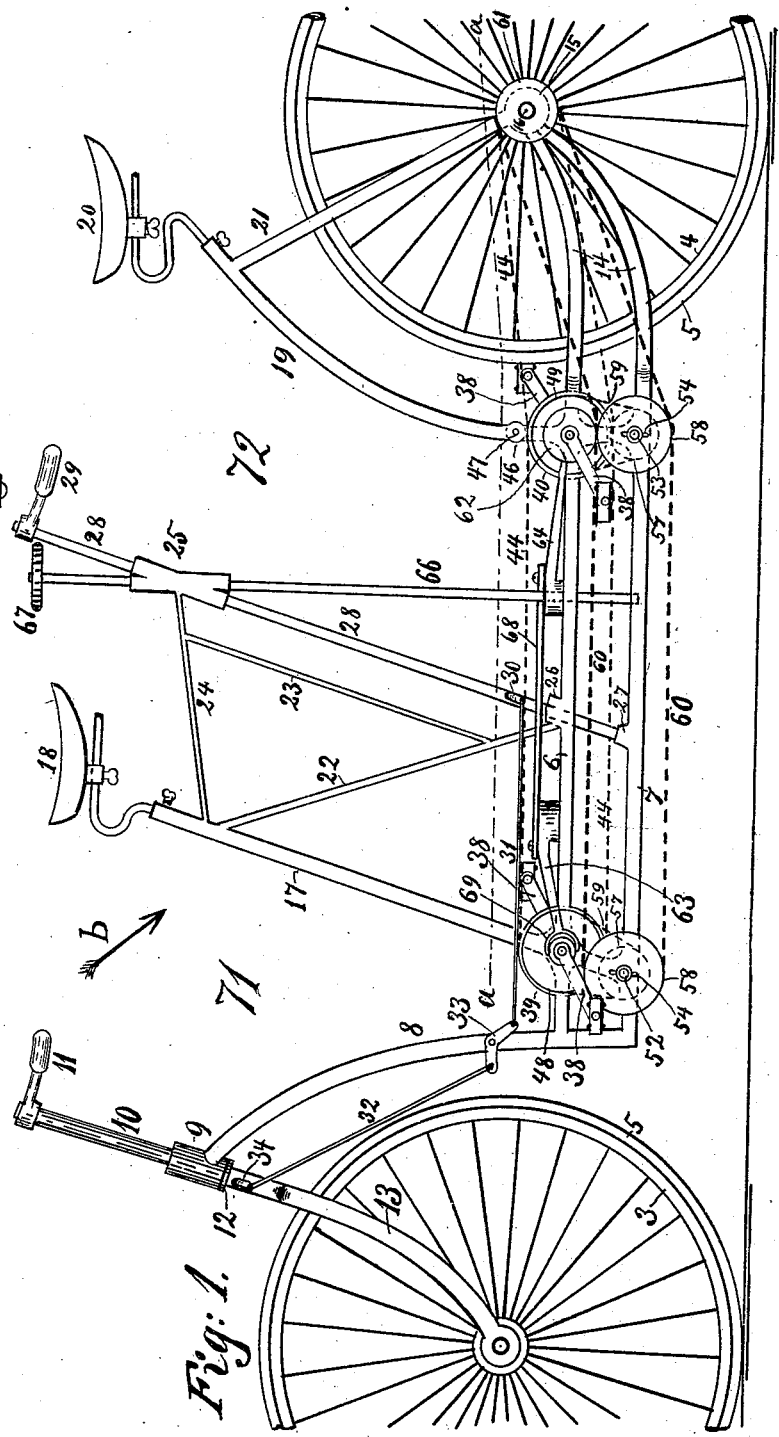
Figure 2:
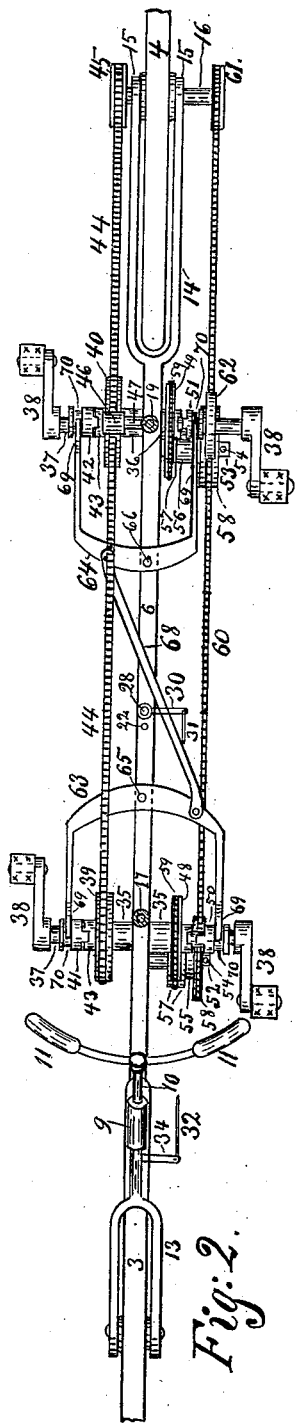

Figure 1 is a left-hand side elevation of my complete bicycle with all chain-wheels shown as solid and without sprockets in order to not obscure the view by the lines of the spokes and sprockets. Fig. 2 is a top or plan view of Fig. 1 with the portions of the frame above the line *a a* removed and looking in the direction of the arrow *b* in Fig. 1, so as to get a view of the lower chain-wheels.

In both of the views portions of the carrier-wheels are cut away at the extreme ends of the machine.

Referring to the drawings by reference-numerals, 3 is the front and 4 is the rear carrier-wheel, both of which are provided with rubber tires 5 in the usual manner.

The frame of the machine is made up of the two horizontal bars 6 and 7, which are located vertically below each other, and the upright bar 8, which is united with the front ends of the bars 6 and 7, and at its upper end is provided with a journal-bearing 9, in which rocks the steering-tube 10, having the handles 11, collar 12, and the fork 13, in which the axle of the front carrier-wheel 3 is journaled. The rear ends of the bars 6 and 7 are formed into the forks 14, which slope or curve upward and are united with the journal-boxes 15, holding the shaft 16 of the hind wheel 4. The frame further consists of the seat-rod 17, which holds the front seat 18, and the rear rod 19, which holds the rear seat 20, and is supported by the braces 21, extending down on both sides of the hind wheel and are secured to the journal-bearings 15. The front seat-bar 17 has a similar supporting-brace 22.

23 and 24 are united braces for holding the cross-like double journal-box 25 in its proper position. In the said journal-box 25 and in the journal-bearings 26 and 27 on the horizontal frame-bars I journal the steering rock-shaft 28, having the handles 29, and being provided near its lower end with the side arm 30, which, by means of the rods 31 and 32 and the bell-crank lever 33, is connected with the side arm 34, secured in the side of the front steering-fork or its shank, so that the front and rear handles must work in unison.

The frame-bar 6 is provided with the bearings 35 and 36, in which are journaled, respectively, the front and rear pedal-shafts 37, having secured upon their ends the pedals 38. Upon one side of the machine (in the present instance on the right-hand side) I provide upon the front and rear pedal-shafts the loose chain-wheels 39 and 40, which may at any time be connected with the shafts by means of the clutches 41 and 42, which are feather-keyed upon the pedal-shafts and are provided with grabbing-teeth adapted to engage similar teeth provided upon the hubs of the said chain-wheels when thrown against the latter by a mechanism which will presently be described.

44 is an endless drive-chain passed over the drive-wheel 45, secured upon the shaft 16 of the rear carrier-wheel 4 and over the chain-wheel 39. It also engages the lower and upper side of the sprocket-wheel or chain-wheel 40, so as to be driven, also, by the rear pedals. The upper part of this chain is kept in contact with the wheel 40 by means of a sheave or idler-wheel 46, revolving upon a stud 47, secured in the seat-bar 19. This chain 44 imparts the slow and powerful motion to the machine. For the fast motion I provide the following mechanism: Upon the front and rear pedal-shafts I provide the loose chain-wheels 48 and 49, respectively, which may be connected with the shafts by means of the clutches 50 and 51, engaging the hubs of the wheels in exactly the same manner as already described for the right-hand side of the machine. In the lower frame-bar 7 I provide two studs 52 and 53, upon which is retained by the pins 54 the revoluble sleeves 55 and 56, each of which carries upon its inner end a rigidly-secured sprocket-pinion or small chain-wheel 57 and upon its outer end a rigidly-secured large sprocket-wheel 58.

59 are endless chains by which the wheels 48 and 49 each drives one of the small sprocket-wheels 57, thereby revolving the sleeve 55, and the larger sprocket-wheels 58 driving the endless chain 60, which is passed over it and over the sprocket-wheel 61, secured on the shaft 16. The chain 60 also engages the lower side of the rear sprocket-wheel 58, and has its upper part held in contact with the upper side of the wheel by means of the chain-guiding pulley 62, which revolves loosely upon the rear pedal-shaft. Thus the chain 60 is made to drive the hind wheel 4 with an increased speed, the rate of which depends on the proportionate sizes of the speed-increasing chain-wheels. When the clutches 41 and 42 are engaging the wheels 39 and 40, the clutches 50 and 51 are held out of engagement with the wheels 48 and 49, so that the latter may revolve as idlers, and when the clutches 50 and 51 are thrown into engagement with the wheel 48 and 49 the clutches 41 and 42 are thereby thrown out of engagement with their respective wheels 39 and 40, which are then likewise allowed to revolve as idlers driven slowly by the chain and its wheel on the shaft 16. This motion of the clutches is obtained from the two U-shaped shifters 63 and 64, of which the front one is pivoted at 65 upon the frame-bar 6 and the rear one is secured upon the rock-shaft 66, which is journaled in the frame-bars 6 and 7 and in the cross-shaped frame portion or journal-box 25, and has its top end provided with a hand-wheel 67, by which the clutches may be thrown or shifted by either one of the two riders, but most conveniently by the one occupying the rear seat 20. The oblique rod 68 connects the two shifters or shifting-levers 63 and 64 in such a manner that when the wheel 67 is given a partial turn the two shifters with their four forks, like 69, (best shown in the front part of Fig. 1,) engaging the annular grooves 70 in the clutches, will throw all the clutches either toward the right or the left side, thereby causing the clutches on one side of the machine to engage their respective wheels and the clutches on the other side of the machine to disengage the respective wheels, and thereby put to use the fast or slow gearing for driving the machine at different speeds.

In operation the riders step in through the open spaces 71 and 72, take their seats on the saddles 18 and 20, seize the handles 11 and 29, and operate the pedals in the usual manner and are both able to partake in the steering and balancing of the machine by means of the handles and the connecting-rods 31 32 and bell-crank lever 33, and when it is desired to change the speed the operator on the rear seat 20 steers with one hand, while his other hand gives a partial turn to the wheel 67, thereby moving all of the clutches, so as to set in operation either the chain 44 for slow speed or the chain 60 for fast speed.

Having thus described my invention, what I claim as new, and desire to secure by Letters Patent, is—

In a bicycle the combination of the front steering wheel 3, and the driving wheel 4, having the two chain wheels 45, and 61, secured on its shaft, the elongated central frame, mounted or suspended on said carrier wheels and being provided with seats, handles, and pedals for two riders, said frame having the horizontal bars 6, and 7, located the one below the other near the ground, the upper one of said frame bars having the transverse journal boxes 35, and 36, the pedal shafts 37, journaled therein and being provided with the pedals 38, the loose chain wheels 39, and 40 journaled on said shafts, and the clutches 41, and 42, sliding on said shafts and being adapted to engage the said wheels, the endless chain 44, operated by said wheels and driving the wheels 45, and 4, at a moderate speed; the loose chain wheels 48, and 49, arranged upon the pedal shafts on the opposite side of the frame, the clutches 50, and 51, adapted to engage the said wheels and cause them to revolve with the pedal shafts; the studs 52, and 53, secured in the lower frame bar, the small and large chain wheels 57, and 58, secured together in pairs and revolving upon said studs, the two endless chains 59, engaging the small chain wheels 57, on the studs and the chain wheels 48, and 49, on the pedal shafts, the endless chain 60, driven by the wheels 58, and driving at an increased rate of speed the chain wheel 61, and the carrier wheel 4, the chain-guiding pulleys 46, and 62, and means for shifting the clutches in changing the speed, substantially as shown and described and for the purpose set forth.

In testimony whereof I affix my signature in presence of two witnesses.

WILLIAM C. FORTNEY.

Witnesses:
JOHN L. VIVEN,
STEPHEN C. MILLS.